United States Patent [19]
Murphy

[11] 3,815,446
[45] June 11, 1974

[54] SHARPENING APPARATUS FOR CIRCULAR SAW BLADES

[76] Inventor: Thomas J. Murphy, 79 Westchester Ave., North Babylon, N.Y. 11704

[22] Filed: Apr. 5, 1973

[21] Appl. No.: 348,358

[52] U.S. Cl. .................................................. 76/43
[51] Int. Cl. ............................................ B23d 63/12
[58] Field of Search ................ 76/37, 40, 41, 42, 43

[56] References Cited
UNITED STATES PATENTS

| | | | |
|---|---|---|---|
| 2,130,965 | 9/1938 | Porter | 76/43 |
| 2,764,043 | 9/1956 | Daggett | 76/43 |
| 2,977,822 | 4/1961 | Hamberger et al. | 76/43 |
| 3,279,282 | 10/1966 | Gill | 76/40 |
| 3,457,809 | 7/1969 | Bowerman | 76/40 |
| 3,616,711 | 11/1971 | Daggett | 76/37 |

*Primary Examiner*—Harrison L. Hinson
*Attorney, Agent, or Firm*—Lades, Parry, Von Gehr, Goldsmith & Deschamps

[57] ABSTRACT

A sharpening apparatus for circular saw blades is described in which a carriage for a circular saw blade is mounted on a frame for movement to and from a grinding wheel carried by the frame. Horizontally disposed in spaced parallel relation on the carriage are a blade supporting table, a lower elongate table and a cross-plate. One end of the lower table carries an upstanding bearing housing for a drum-shaped spindle on which the blade supporting table rests and to which the blade supporting table may be locked anywhere along a first slot therethrough for rotation thereof about the spindle axis. The one end of the lower table also carries a scissors clamp operable to clamp the spindle and prevent the blade supporting table from rotating about the spindle axis. The lower table is pivotally connected at its other end to the cross-plate with its pivotal movement being limited to a given angular range within the width of the frame and being capable of being held anywhere within that range to fix the angular position of the spindle axis with respect to the pivot axis of the lower table. A second slot through the blade supporting table slidably supports an upstanding arbor for horizontally carrying a circular saw blade for rotation about the arbor axis, the arbor being lockable to the second slot anywhere along the length thereof. An index finger pivotally mounted on the blade supporting table is movable to and from an operative position where the end of the finger can engage the leading face of a tooth of the blade. The grinding wheel axis can be selectively angularly displaced, in a vertical plane normal to the carriage path, from a horizontal position at the level of the circular saw blade.

11 Claims, 8 Drawing Figures

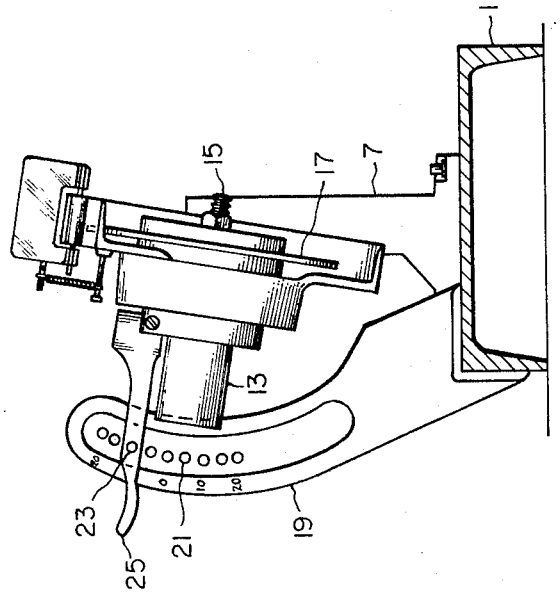
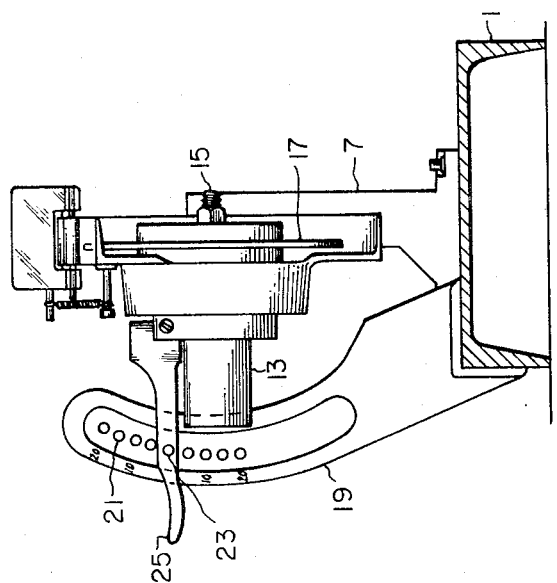

PATENTED JUN 11 1974   3,815,446

SHARPENING APPARATUS FOR CIRCULAR SAW BLADES

BACKGROUND OF THE INVENTION

This invention relates to improvements in apparatus for sharpening circular saw blades.

A circular saw blade sharpening apparatus is disclosed in U.S. Pat. No. 2,764,043 for sharpening circular saw teeth respectively having a straight leading face and a continuously curved trailing face (or back).

In that apparatus, the blade is horizontally supported by an arbor for rotation about the blade axis, the arbor being carried by a horizontal table having an elongate slot therethrough, over the length of which the arbor may be slid and locked in a selected upright position.

The table of the known apparatus is provided with an aligned series of holes, any desired one of which receives a pivot pin projecting upwardly from and integral with one end of a flat elongated horizontal strip below the table. The other end of the strip is pivotally connected to an underlying horizontal cross-plate of a carriage slidably supported on an elongated frame for movement between limit stops toward and away from a grinding wheel supported on the frame for rotation in at least a vertical plane parallel to the path of the carriage.

An arcuate slot through the cross-plate of the known apparatus receives a pin depending from the flat elongated strip, and a hand nut threadedly engaged with the end of the pin serves to lock the strips anywhere within a range of angular positions relative to the cross-plate determined by the arcuate slot length.

The known apparatus also includes an index finger pivotally mounted on the table in a position to engage the blade teeth for accomplishing a tooth by tooth advance of the saw blade. The leading face of a tooth is moreover held in contact with the index finger while the table and carriage are manipulated to cause the grinding wheel to shape the continuously curved back of the tooth.

The known apparatus has a number of drawbacks, including the necessity therein of horizontally affixing to the cross-plate a long curved bar which extends a substantial distance beyond each side of the carriage to serve as a bearing surface for the blade supporting table. Another drawback is the necessity of lifting the blade supporting table off its bearing surface whenever a different one of the aligned series of holes is selected to receive the pivot pin projecting upwardly from the flat strip below the table. Even then, the permissible radii of the circular paths over which the center of the saw blade can be moved by rotating the blade supporting table about its pivot pin is limited to the number of holes in the aligned series. Yet another drawback is the lack of any provision for locking the blade supporting table against rotation about its pivot pin in order to ensure that uniform hook angles will be obtained for all the teeth of the circular saw blade during a gumming mode of operation of the apparatus.

SUMMARY OF THE INVENTION

According to the invention, the known sharpening apparatus for circular saw blades has been improved to eliminate at least the aforesaid drawbacks. In this respect, the blade supporting table of an apparatus constructed according to the invention rests directly on the end of a vertically oriented drum-shaped bearing spindle which defines an axis of rotation of the table. Moreover, without lifting the blade supporting table, an infinite number of radii within a given range can be selected for the circular path to be described by the center of the saw blade when the table is rotated. In addition, the blade supporting table can be locked against rotation anywhere over a range of positions, at any one of which the leading face of each tooth will be ground with a corresponding identical hook angle during a gumming mode of operation of the improved apparatus.

It is accordingly an object of the invention to provide an improved sharpening apparatus for circular saw blades.

Other objects are to provide a sharpening apparatus for circular saw blades which, compared to apparatus heretofore known, is more compactly constructed, is more readily and more widely adjustable and is less demanding of operator skill.

BRIEF DESCRIPTION OF THE DRAWINGS

Other objects and advantages of the invention will become apparent from the following description of the preferred embodiment in conjunction with the accompanying drawings, in which:

FIGS. 2, 3 and 4 are end views of my apparatus in cross-section facing the motor end of the frame and showing how the drive shaft of the grinding wheel may be selectively adjusted to horizontal, downwardly tilted and upwardly tilted positions, respectively;

DESCRIPTION OF THE PREFERRED EMBODIMENT

Figure 1:
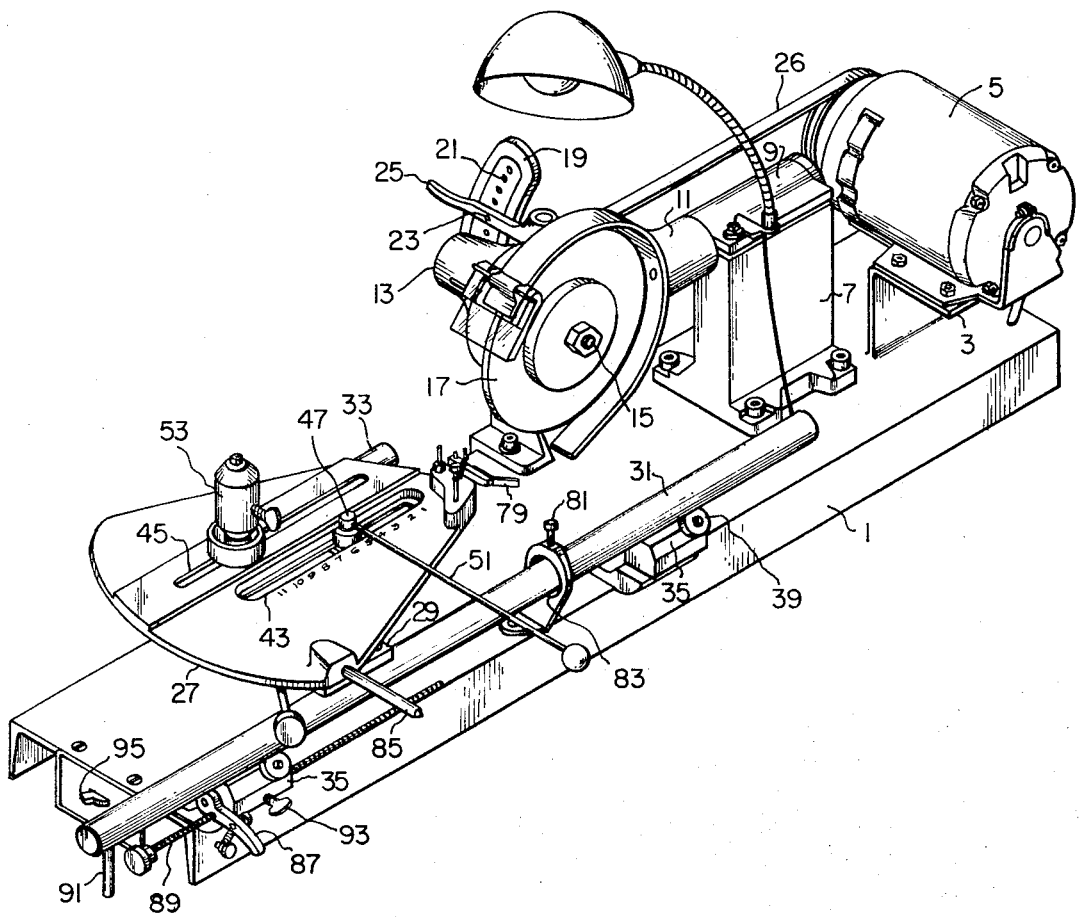
FIG. 1 is an isometric view of my apparatus, showing the blade supporting table mounted on the carriage and showing the elongated frame carrying the grinding wheel while slidably supporting the carriage.

Referring to FIG. 1, an elongated frame 1 is an inverted structural steel channel member having a raised mounting pad 3 welded thereto at its right-hand end to which a drive motor 5 is bolted athwart the frame. To the left of motor 5, an upright stanchion 7 is bolted to frame 1 and carries a pillow block 9 at its top in which is journalled an axle 11 for rotation about a horizontal axis parallel to the length direction of frame 1. The axle 11 is part of a casting which includes a bearing housing 13 in which a rotatable drive shaft 15 for a grinding wheel 17 is journalled, the arrangement being such that shaft 15 is disposed athwart frame 1 and is tiltable in a vertical plane about the axis of axle 11 to either side of a horizontal position.

Figure 4:
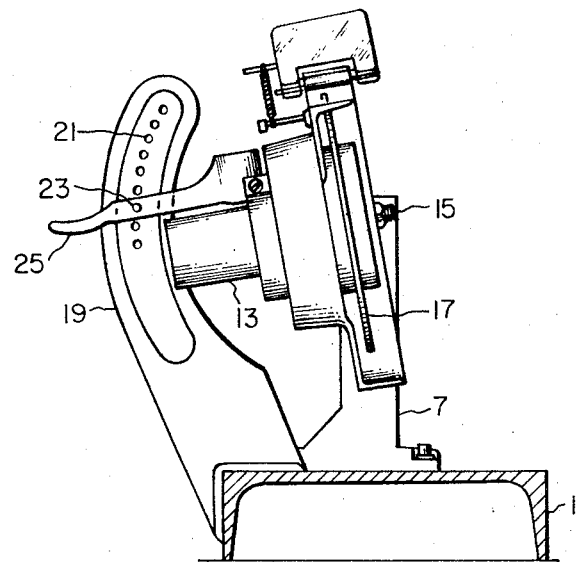

As will be more clearly seen in FIGS. 2, 3 and 4, provision is made for adjusting the tilt of shaft 15 over a range of discrete angular positions including a horizontal position in which grinding wheel 17 will lie in a vertical plane parallel to the length direction of frame 1.

Thus, frame 1 is provided with a rigid upstanding arcuate arm 19 having an array of holes 21 for receiving, one at a time, a spring-loaded positioning pin 23 on a hand lever 25 rigidly affixed to the casting that includes bearing housing 13. In FIG. 2, pin 23 is in a hole 21 which positions shaft 15 horizontally for the grinding of saw teeth without bevels, a "0" index numeral being provided adjacent this hole on arcuate arm 19. In FIG. 3, pin 23 is in a hole 21 which tilts shaft 15 upwardly to provide a 10° bevel on saw teeth that are set "up," a "10" index numeral being provided adjacent this hole on arcuate arm 19. In FIG. 4, pin 23 is in a hole 21 which tilts shaft 15 downwardly to provide a 10° bevel on saw teeth that are set "down," a "10" index numeral being provided adjacent this hole on arcuate arm 19. The number and spacing of holes 21 is such that bevels up to 20° can be selected at 5° increments for either "up" teeth or "down" teeth of a circular saw blade. Whatever the selected tilting adjustment may be, a belt 25 remains in operative coupling relationship with pulleys respectively fixed to the shaft of drive motor 5 and shaft 15 of grinding wheel 17.

Figure 7:
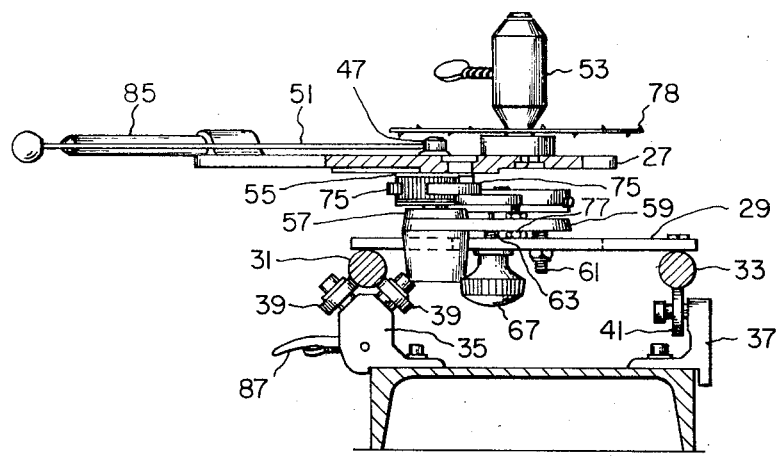
FIG. 7 is a cross-section taken along lines A—A of FIG. 6.

Returning now to FIG. 1, an elongate blade supporting table 27 is horizontally disposed on a carriage formed by a horizontal cross-plate 29 bolted to a spaced parallel pair of cylindrical rods 31, 33. Rod 31 is longer than rod 33 and rides on two identical roller bearing supports 35 spaced along and mounted upon the right hand side of frame 1 as seen by a viewer at the frame end remote from motor 5. The shorter rod 33 rides on a single roller bearing support 37 (FIG. 7) mounted on the other side of frame 1 about equidistant from each of supports 35. As shown in FIG. 7, each roller bearing support 35 includes a pair of wheels 39 whose rotational axes intersect at 90° and whose peripheries engage the underside of rod 31. On the other hand, roller bearing support 37 has only one wheel 41 whose rotational axis is horizontal and whose periphery engages the underside of rod 33. By this arrangement, the carriage is freely rollable toward and away from the grinding wheel location while being constrained against lateral movement with respect to frame 1.

Figure 8:
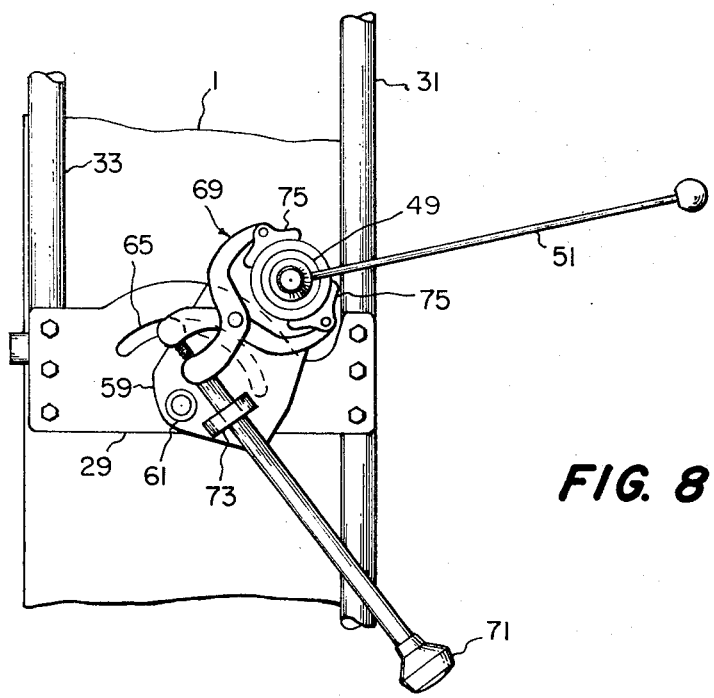
FIG. 8 is a top plan view of the carriage of my apparatus with the blade supporting table removed.

Elongate blade supporting table 27 has first and second spaced parallel slots 43, 45 therethrough generally disposed in its length direction. The first slot 43 in table 27 receives a reduced diameter coaxial extension 47 of a rotatable drum-shaped bearing spindle 49 (FIG. 8) and is lockable to extension 47 anywhere along the length of slot 43 by swinging a hand-operated lever 51 a few degrees clockwise in a horizontal plane. A conventional arbor device 53 for horizontally supporting a circular saw blade for rotation above the upper surface of table 27 substantially at the horizontal position level of grinding wheel drive shaft 15 is positionable anywhere along the second slot 45 in table 27 and is releasably lockable thereto by manually twisting arbor device 53 about its own axis.

Blade supporting table 27 rests on a horizontal shoulder 55 (FIG. 7) defined by the junction of drum-shaped bearing spindle 49 and its reduced diameter coaxial extension 47. Spindle 49 extends upwardly from a vertical bearing housing 57 affixed to one end of a horizontal auxiliary elongate table 59 whose other end is pivotally affixed by a bolt 61 to the upper surface of horizontal cross-plate 29 of the carriage.

A pin 63 depending from the lower surface of auxiliary table 59 is received in an arcuate slot 65 through cross-plate 29 which is conformed to the path described by pin 63 as auxiliary table 59 pivots on bolt 61. A twist knob 67 threadedly engaged to pin 63 below cross-plate 29 serves to lock pin 63 to arcuate slot 65 and thereby fix auxiliary table 59 at any pivotal position within the angular range permitted by the extent of slot 65, this range corresponding to slightly less than the width of frame 1.

A scissors-type clamping mechanism 69 (FIG. 8) operated by a twist knob 71 is mounted on auxiliary table 59 by means of a supporting pad 73. Clamping mechanism 69 includes a pair of jaws 75 disposed in a position to grip drum-shaped bearing spindle 49 and thereby prevent blade supporting table 27, when clamped to coaxial extension 47, from rotating about the axis of spindle 49. Knurling is preferably provided on the surface of spindle 49 to ensure positive gripping by jaws 75.

At least one jack screw 77 is threaded into the under surface of auxiliary table 59 and has a head which rides on the upper surface of cross-plate 29.

Figure 5:
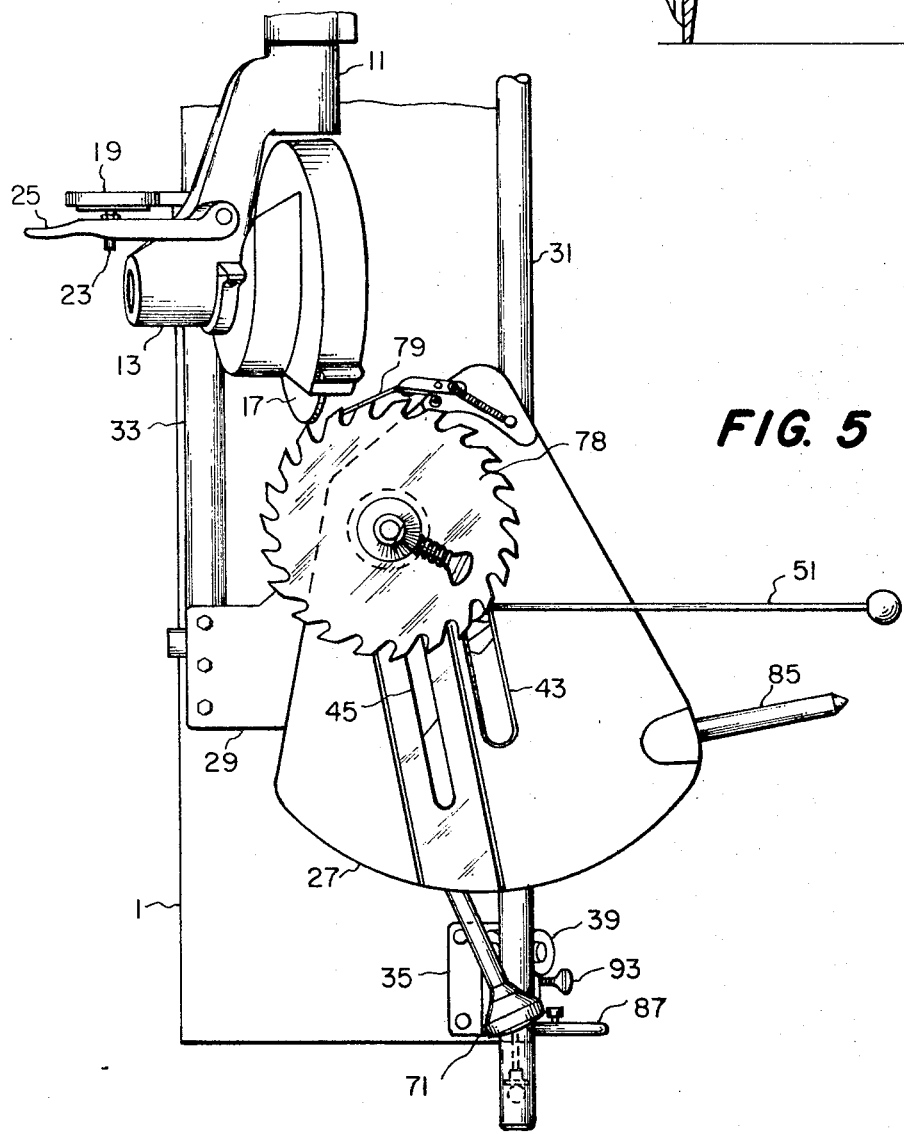
FIGS. 5 and 6 are similar top plan views of my apparatus respectively showing the pivotally mounted index finger in the operative position where the end of the finger engages the leading face of a tooth of a circular saw blade and in the inoperative position where the end of the finger has been swung clear of the blade.
Figure 6:
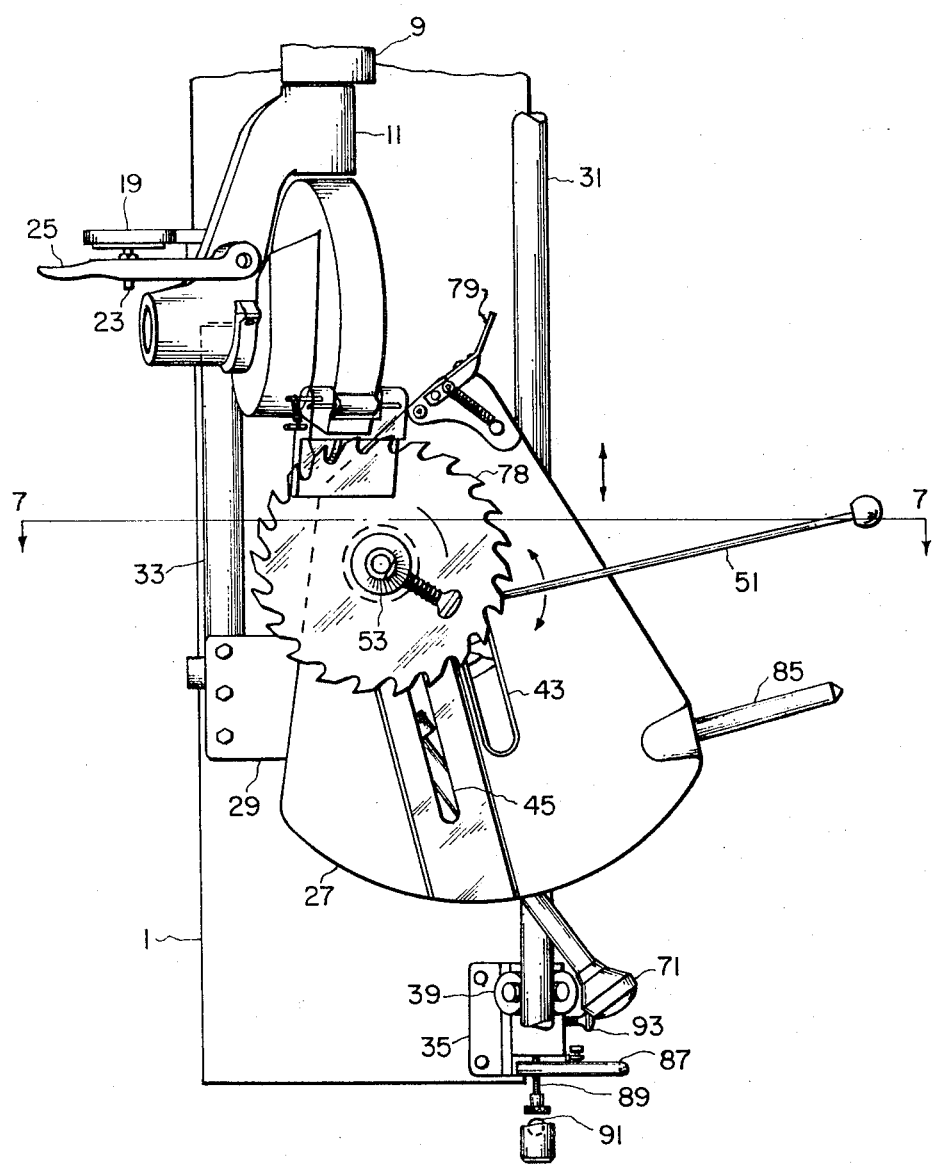

In using my apparatus, blade supporting table 27 is slid upon its rest until coaxial extension 47 is located at the proper position along the length of slot 43 as determined by index numbers adjacent slot 43 which are correlated with respective circular saw blade diameters. Rod 51 is then manipulated to clamp table 27 to spindle 55. Thereafter, the circular saw blade 78 to be sharpened is mounted on arbor device 53 with its teeth pointing clockwise, and the arbor device is slid in slot 45 until the end of an index finger 79 (FIG. 5) engages the leading face of one of the teeth. Index finger 79 is horizontally mounted on blade supporting table 27 for pivotal movement between a non-operative position (FIG. 6) remote from the teeth of a circular saw blade supported by arbor device 53 and an operative position where the end of the finger can engage the leading face of a tooth of the blade. Such index fingers are conventionally used as pawls to effect a tooth-by-tooth rotational advance of a circular saw blade.

With the end of index finger 79 contacting the leading face of the tooth about halfway between the tip and bottom, the arbor device 53 is secured to slot 45. At this time, scissors clamp 69 has been loosened by knob 71 and auxiliary table 59 has been freed for pivotal movement by manipulation of knob 67. Moreover, a cap screw 81 has been loosened where carriage bar 31 passes through an eye 83, thereby freeing the carriage for rolling movement to and from grinding wheel 17.

Assuming that a 10° bevel angle is to be put on the face of the teeth, the grinding wheel is swung clockwise by lifting hand lever 25 and allowing the positioning pin 23 on the lever to enter the particular hole 21 located at the upper "10" index numeral on arcuate arm 19. While keeping finger pressure on saw blade 78 (FIG. 5) to hold the tooth that is set "down" against the end of index finger 79, one rolls the carriage toward grinding wheel 17 and shifts blade supporting table 27 laterally either right or left to allow the tooth to the left of the tooth that is against index finger 79 to align exactly with the left side of grinding wheel 17 while the wheel is bottomed in the gullet. A grip rod 85 is affixed to blade supporting table 27 to facilitate its lateral shifting and the rolling of the carriage by an operator.

Still keeping finger pressure on saw blade 78 to hold the tooth that is set "up" against the left side of grinding wheel 17, while the tooth that is set "down" is against index finger 79, one tightens both the scissors clamp knob 71 and the auxiliary table locking knob 67 in order to secure blade supporting table 27 against lateral movement. One then holds saw blade 78 and blade supporting table 27 with his left hand to keep grinding wheel 17 bottomed in the gullet of the "up" tooth, and with his right hand lifts up a carriage stop lever 87 (FIGS. 1 and 6) to release it from threaded engagement with a threaded stop rod 89 which is then slid back to a carriage stop bar 91 depending from the end of carriage rod 31. Lever 87 is then lowered and a thumb screw 93 passing through the adjacent roller bearing support 35 perpendicularly to threaded stop rod 89 which also passes through the support is thereafter tightened to lock threaded stop rod 89 against any further movement. The forward motion of the carriage is now restricted to stop at exactly the same place on frame 1 each time it is rolled forward, so that when gumming the teeth one will be able to clean out the bottom of each tooth gullet to a precise uniform depth.

One then rolls the carriage back away from grinding wheel 17, swings index finger 79 away from blade 78 and operates a switch 95 (FIG. 1) to start motor 5. Holding the left edge of blade 78 between the thumb and first finger of his left hand while holding grip rod 85 with his right hand, one rolls the carriage to grinding wheel 17 allowing the leading face of the "up" tooth to come into sliding contact with the left side of the grinding wheel until the carriage can travel no further. Blade pressure against the grinding wheel is then released and the carriage is backed off about one half the length of the tooth. These two steps are repeated two or three times with less pressure on each stroke, until the leading face of the tooth is sharp and free from burns. Then the first step is repeated with very light pressure, and as one goes into the second step he rotates blade 78 counterclockwise to allow the edge of grinding wheel 17 to follow the contour of the back of the tooth to the right of the gullet, i.e., the tooth set "down." Very light pressure is used, since one is not sharpening the back of the tooth, but simply cleaning it for appearance. This done, one rotates blade 78 counterclockwise past the "down" tooth and repeats the grinding steps at the next "up" tooth, and so on, completely around the blade to the starting tooth. Then, with the carriage and blade 78 rolled away from grinding wheel 17, one operates hand lever 25 to change the grinding wheel angle to the lower "10" index numeral on arcuate arm 19 and carries out the foregoing steps on the teeth that are set "down." That done, the blade is completely gummed out and ready to be tipped.

Going into the tipping mode of operation of my apparatus, one leaves the grinding wheel angle at the lower "10" index numeral and swings index finger 79 counterclockwise to its operative position in front of an "up" tooth. With the thumb and first finger on his left hand holding the left side of blade 78 so that the leading face of the "up" tooth is engaged by the end of index finger 79, one loosens scissors clamp knob 71 to allow blade supporting table 27 to rock on the axis of drum-shaped bearing spindle 49. He then adjusts threaded stop rod 89 back towards himself so that the carriage will stop with the tip face of the "up" tooth being approximately ⅛ inch from the edge of grinding wheel 17. With his left hand still holding the blade and the edge of his left palm resting on blade supporting table 27, holding the carriage against its stop, he rocks table 27 from side to side while using his right hand to turn threaded stop rod 89 clockwise to bring the tip face of the "up" tooth into contact with grinding wheel 17. He continues turning stop rod 89 in while rocking table 27 so that the tip face of the "up" tooth passes completely across the edge of the grinding wheel several times and enough material has been removed to produce keen edges on the tip face. He then locks the thumb screw 93 against stop rod 89, backs the carriage away from grinding wheel 17 and rotates blade 78 counterclockwise, allowing index finger 79 to pass over the "down" tooth and to come to rest in the guide in front of the leading face of the next "up" tooth. Pressing this leading face against the end of index finger 79, he rolls the carriage against its stop and continues the rocking motion of table 27 as before until the tip face of the tooth is completely sharpened and just barely touches the grinding wheel as it passes by. This is repeated for each "up" tooth around the blade, after which the position of the grinding wheel is adjusted to upper "10" index numeral on arcuate arm 19 and the tip face of each "down" tooth is then sharpened in succession to complete the tipping of the circular saw blade.

Although my circular saw blade sharpening apparatus has been described for illustrative purposes in conjunction with the sharpening of chisel tooth saws having bevelled teeth, it will be appreciated that chisel tooth saw blades having straight teeth can be sharpened by the apparatus, as well as novelty combinations, planar and cutoff saw blades having bevelled or straight teeth. The sharpening procedures for all types of circular saw blades fall into the same general pattern, the major difference being in the slot 43 setting of blade supporting table 27 insofar as cutting teeth are concerned. The raker, or cleanout, teeth of novelty combinations and planar plates can usually be done with the same slot settings used for chisel teeth. The grinding wheel to be used for gumming and tipping chisel tooth saws should be dressed with a rounded edge approximately the gullet shape. Similarly, for fine teeth with triangular shaped gullets, as in the case of the cutting teeth of a planar saw, the grinding wheel should be dressed with a triangular edge.

What is claimed is:

1. Circular saw blade sharpening apparatus comprising, in combination:

a. an elongated frame;

b. a rotatable drive shaft for carrying a grinding wheel, said drive shaft being supported by means on said frame permitting selective adjustment of the shaft axis in a vertical plane athwart said frame over a range of discrete angular positions including a horizontal position in which the grinding wheel will lie in a vertical plane parallel to the length direction of said frame;

c. a carriage slidably supported by said frame for movement in the length direction of said frame toward and away from the grinding wheel, said frame including settable stop means for selectively limiting carriage movement toward the grinding wheel and locking means for releasably locking the carriage against movement relative to said frame;

d. a cross plate horizontally affixed to said carriage across the carriage width;

e. a first horizontal elongate table overlying said cross plate and pivotally affixed near one of its ends to said cross plate while extending towards the frame region underlying the grinding wheel drive shaft, said first table and cross plate having cooperating means for limiting the pivotal movement of said first table to a given angular range within the width of said frame and for releasably locking said first table at any position within said angular range;

f. a vertical bearing housing affixed to said first table at the other end thereof and having a rotatable drum-shaped bearing spindle extending upwardly from said housing with a reduced diameter coaxial extension, said first table having clamping means mounted thereon for releasably clamping said vertical bearing spindle below its coaxial extension against rotation;

g. a second horizontal elongate table having first and second spaced parallel elongate slots therethrough generally disposed in the length direction of said second table, said second table resting on a horizontal shoulder defined by the junction of said drum-shaped bearing spindle and its reduced diameter coaxial extension, said extension passing through said first slot and having clamping means on its free end for releasably clamping said second table against said horizontal shoulder anywhere along said first slot;

h. an arbor for horizontally supporting a circular saw blade for rotation above the upper surface of said second table substantially at the horizontal position level of said grinding wheel drive shaft, said arbor being positionable anywhere along said second slot and being releasably lockable thereto; and i. an index finger horizontally mounted on said second table for pivotal movement between a nonoperative position remote from the teeth of a circular saw blade supported by said arbor and an operative position where the end of said finger can engage the leading face of a tooth of said blade while the periphery of a grinding wheel carried on said drive shaft is in the gullet common to the trailing face of that tooth and the leading face of an adjacent tooth.

2. Apparatus according to claim 1, wherein said cooperating means ofsaid first table and cross plate comprises a pin depending from the lower surface of said first table, an arcuate slot through said cross plate which receives said pin and is conformed to the path described by said pin as said first table pivots about its said one end, and a twist knob threadedly engaged to said pin below said cross plate for locking said pin to said arcuate slot.

3. Apparatus according to claim 1, wherein said first table is provided with at least one jack screw threaded into its under surface and having a head which rides on the upper surface of said cross plate.

4. Apparatus according to claim 1, wherein said drum-shaped bearing spindle has a knurled outer surface, said clamping means for said spindle having a pair of scissor jaws manually operable by a knob to grip said knurled surface.

5. Apparatus according to claim 1, wherein said clamping means for releasably clamping said second table against said horizontal shoulder of the drum-shaped bearing spindle is operable by an elongated rod extending from said reduced diameter coaxial extension and movable in a horizontal plane between a clamping and an unclamping position.

6. Apparatus according to claim 1, wherein the first slot through the second table is lengthwise calibrated with index markings on the upper surface of said second table alongside said first slot for reference in positioning said second table before it is clamped against the horizontal shoulder of said drum-shaped bearing spindle.

7. In a circular saw blade sharpening apparatus having a table for supporting a circular saw blade for rotation about the blade axis, said table itself being supported for rotation about a second axis parallel to and spaced from said blade axis and for rotation about a third axis parallel to and spaced from said blade axis, the improvement comprising:

a. first means permitting the blade supporting table to be shifted relative to said second and third axes anywhere within a given displacement range along a straight line in a plane normal to said second and third axes, b. second means limiting the rotation of the blade supporting table about said third axis to a given angular distance less than 180°, c. third means for releasably locking the blade supporting table against rotation about said second axis, and d. fourth means for releasably locking the blade supporting table against rotation about said third axis.

8. Apparatus according to claim 7, wherein said first means comprises an elongated straight slot through the blade supporting table having a length substantially equal to said given displacement range, said second axis being defined by a bearing mounted rotatable spindle which passes through said straight slot and is releasably lockable thereto anywhere along the length of said straight slot.

9. Apparatus according to claim 8, further comprising an auxiliary table on which said bearing mounted rotatable spindle is carried, an elongated frame, an elongated carriage mounted on the frame for rolling movement along the frame length and a cross-plate connected across the width of the carriage, said auxiliary table being rotatably coupled to said cross-plate by a link defining said third axis.

10. Apparatus according to claim 9, wherein said second means comprises a pin extending from and normal to said auxiliary table, and an arcuate slot through said cross-plate in which the free end of said pin rides as said auxiliary table is rotated about said third axis, the length of said arcuate slot and the distance between said link and pin determining said given angular distance to which the rotation of the blade supporting table about said third axis is limited.

11. Apparatus according to claim 10, wherein said blade supporting table, auxiliary table and cross-plate are disposed in a horizontal spaced parallel relationship to one another, said frame having means for mounting a grinding wheel for rotation in at least a vertical plane parallel to the length direction of said frame and in a position where the carriage, the blade supporting table and a blade supported thereon can be manipulated to bring a side face of the grinding wheel flat against successive leading faces of the blade teeth in a gumming mode of operation of the apparatus and to bring the narrow peripheral face of the grinding wheel against successive tip faces in a tipping mode of operation of the apparatus.

* * * * *